US00RE37501B1

(19) United States
(12) Reissued Patent
Song

(10) Patent Number: US RE37,501 E
(45) Date of Reissued Patent: Jan. 8, 2002

(54) APPARATUS AND METHOD FOR DISPLAYING CAPTION BROADCAST AND TELETEXT ON THE SCREEN OF A DOUBLE-WIDE TELEVISION

(75) Inventor: Kwon-Eui Song, Suwon (KR)

(73) Assignee: Samsung Electronics Co., Ltd., Kyungki-do (KR)

(21) Appl. No.: 09/313,382

(22) Filed: May 18, 1999

Related U.S. Patent Documents

Reissue of:
(64) Patent No.: 5,757,437
Issued: May 26, 1998
Appl. No.: 08/647,662
Filed: May 15, 1996

(30) Foreign Application Priority Data

May 27, 1995 (KR) ..... 95-13548

(51) Int. Cl.[7] ..... H04N 5/445
(52) U.S. Cl. ..... 348/564; 348/468
(58) Field of Search ..... 348/564, 468, 348/588, 563, 556, 553, 739, 445

(56) References Cited

U.S. PATENT DOCUMENTS 4,954,882 A * 9/1990 Kamemoto ..... 358/22
5,185,598 A * 2/1993 Sakamoto ..... 340/721
5,467,142 A * 11/1995 Ichinokawa ..... 348/556
5,537,151 A * 7/1996 Orr et al. ..... 348/564
5,610,664 A * 3/1997 Bobert ..... 348/564

* cited by examiner

*Primary Examiner*—Victor R. Kostak
(74) *Attorney, Agent, or Firm*—Sughrue, Mion, Zinn, Macpeak & Seas, PLLC

(57) ABSTRACT

An apparatus and method for displaying a caption broadcast and teletext on a wide screen of a double-wide television are provided in which a televised picture and a caption broadcast or teletext are separately displayed without any overlap. The apparatus includes first and second comb filters for converting first and second broadcast signals into luminance (Y) and chrominance (C) signals. The apparatus also includes a signal separating circuit for separating a second video signal output from the first comb filter into a first picture signal and caption and teletext signals, a switching circuit for selectively outputting a first video signal output from the first comb filter and the caption and teletext signals output from the signal separating circuit, a double-picture processing circuit for processing the first picture signal output from the signal separation circuit and the caption and teletext signals output from the switching circuit so that pictures corresponding to the first picture signal and the caption and teletext signals can be displayed in left and right portions of the wide screen, respectively.

22 Claims, 2 Drawing Sheets

APPARATUS AND METHOD FOR DISPLAYING CAPTION BROADCAST AND TELETEXT ON THE SCREEN OF A DOUBLE-WIDE TELEVISION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an apparatus and method for displaying a caption broadcast and teletext on the screen of a double-wide television, and more particularly, to an apparatus and method for displaying a caption broadcast and teletext on the screen of a double-wide television in which a televised picture can be displayed concurrently with a separate caption broadcast picture or teletext picture.

2. Description of Prior Art

When using a conventional television including a remote controller having a key panel which incorporates a caption button, if the caption button is selected by a user while a broadcast including caption and teletext signals is being received, caption information will be displayed over a televised picture. Also, if the key panel of the remote controller includes a teletext button which is selected by a user, a blanking-processed teletext signal block will be displayed over the televised picture.

Thus, when viewing a current broadcast having caption and teletext signals on a conventional television, the caption broadcast picture of teletext picture will overlap the televised picture, so that the televised picture is partially obscured.

SUMMARY OF THE INVENTION

It is an object of the present invention to provide an apparatus and method for displaying a caption broadcast and teletext on the screen of a double-wide television in which a televised picture can be displayed concurrently with the caption broadcast or teletext picture without their being any overlap between the pictures.

According to one embodiment of the invention, there is provided an apparatus for displaying a caption broadcast and teletext on the wide screen of a double-wide television. The apparatus separates first and second broadcast signals including a video signal and caption and teletext signals into luminance (Y) and chrominance (C) signals using first and second comb filters which output said first and second broadcast signals. The apparatus includes a signal separating circuit for separating a second video signal output from the second comb filter into a first picture signal and caption and teletext signals.

The apparatus also includes a switching circuit for selectively outputting a first video signal output from the first comb filter and the caption and teletext signals output from the signal separating circuit. Additionally, a double-picture processing circuit is included in the apparatus for processing the first picture signal output by the signal separation circuit and the caption and teletext signals output from the switching circuit so that pictures corresponding to the first picture signal and the caption and teletext signals can be displayed on corresponding left and right portions of the wide screen, respectively.

A controller is also included in the apparatus for controlling the signal separating circuit to separate the second video signal into the first picture signal and the caption and teletext signals according to a key input, controlling the switching circuit to selectively output the first video signal output from the first comb filter and the caption and teletext signals output from the signal separating circuit and controlling the double-picture processing circuit. A matrix circuit included in the apparatus converts a third video signal output from the double-picture processing circuit having first and second luminance and chrominance components, into a fourth video signal having RGB components. A CRT driver circuit is also included in the apparatus for driving a CRT using the fourth video signal having RGB components.

According to another embodiment of the invention there is provided a method for displaying a caption broadcast and teletext on the wide screen of a double-wide television. The method comprises the steps of displaying a picture corresponding to a broadcast signal including caption and teletext signals on the wide screen of a double-wide television and segmenting the wide-screen into at least two distinct portions if it is determined that a caption key is selected so that a caption display mode is initiated.

The method also includes the step of displaying a televised picture in one of the at least two distinct portions and a picture corresponding to the caption broadcast signal in another one of the at least two distinct portions segmented in the segmenting step.

According to another aspect of the present invention, the method may also include the step of converting the caption display mode into a teletext display mode if the caption key is selected during the step of displaying a televised picture in one of the at least two portions so that a picture corresponding to the teletext signal is displayed in the another one of the at least two distinct portions.

According to yet another aspect of the present invention, the method may also include the step of displaying a picture corresponding to a broadcast signal if the caption key is selected when the picture corresponding to the teletext signal is displayed in the another one of the at least two distinct portions.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
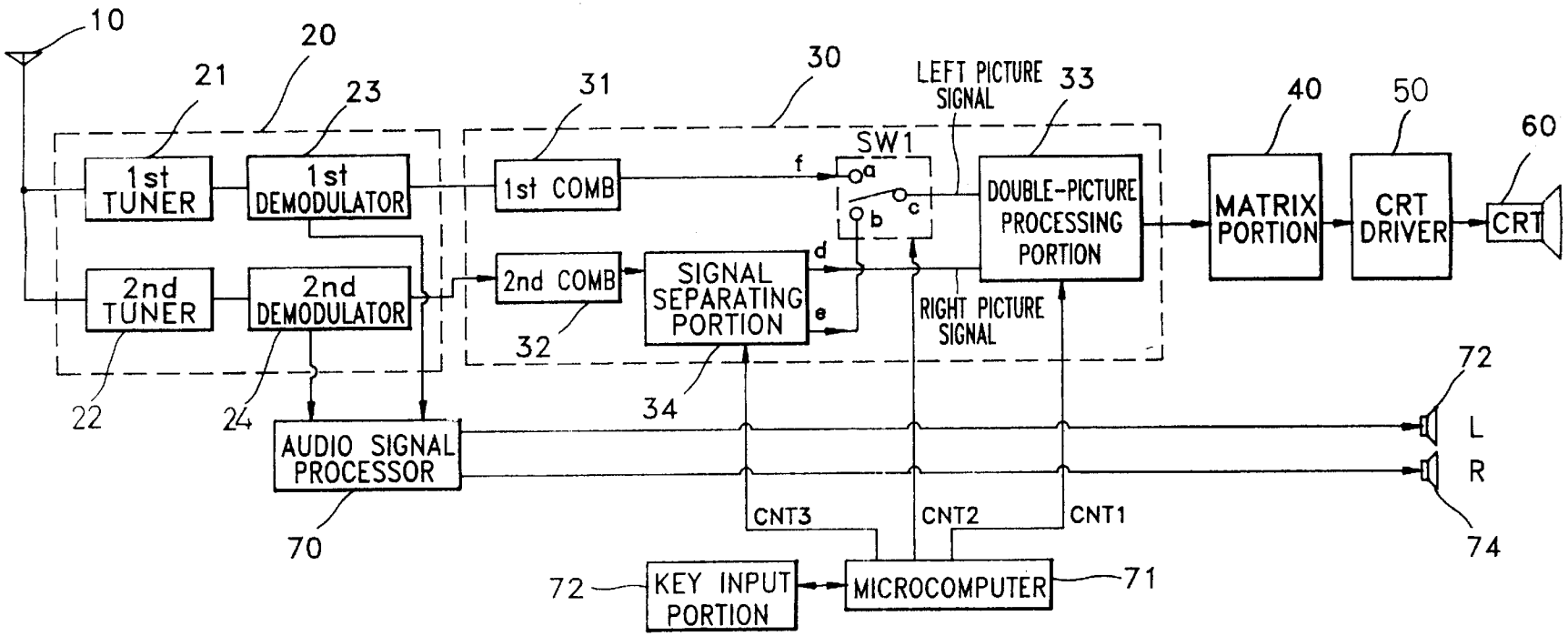
FIG. 1 is a block diagram of an apparatus for displaying a caption broadcast and teletext on the wide screen of a double-wide television according to one embodiment of the present invention.

In FIG. 1, an exemplary apparatus for displaying a caption broadcast and teletext on the screen of a double-wide television according to one embodiment of the present invention includes a television signal receiver 20, an audio signal processor 70, left (L) and right (R) speakers 72 and 74, a microcomputer 71, a video signal processor 30, a matrix portion 40, a cathode-ray tube (CRT) driver 50 and a CRT 60.

The television signal receiver 20 includes first and second tuners 21 and 22 for converting a carrier wave introduced via an antenna 10 into an intermediate-frequency signal, and first and second demodulators 23 and 24 for demodulating video and audio signals from the intermediate-frequency signal. The audio signal processor 70 processes the audio signal output from the first and second demodulators 23 and 24 and then outputs the result to left and right channels. The left (L) and right (R) speakers 72 and 74 are driven by the audio signal and the microcomputer 71 outputs control signals CNT1, CNT2 and CNT3 in accordance with the input of a key input circuit or portion 72.

The video signal processor 30 includes first and second comb filters 31 and 32 for separating first and second video signals output from the first and second demodulators 23 and 24 into luminance (Y) and the chrominance (C) signals, a signal separating circuit or portion 34 for separating the luminance (Y) and chrominance (C) signals output from the second comb filter 32 into a right picture signal (d) and caption and teletext signals (e) in accordance with the control signal CNT3 generated by the microcomputer 71, a switch SW1 for selectively outputting the luminance (Y) and the chrominance (C) signals output from the first comb filter 31 and the caption and teletext signals (e) output from the signal separating circuit 34 as a left picture signal according to the control signal CNT2 of the microcomputer 71, a double-picture processing circuit 33 for processing the left and right picture signals respectively output from the switch SW1 and the signal separating circuit 34 into a double-picture. A matrix circuit 40 converts the luminance (Y) and chrominance (C) signals output from the double-picture processing portion 33 into RGB signals, and the CRT driver 50 drives the CRT.

Figure 2:
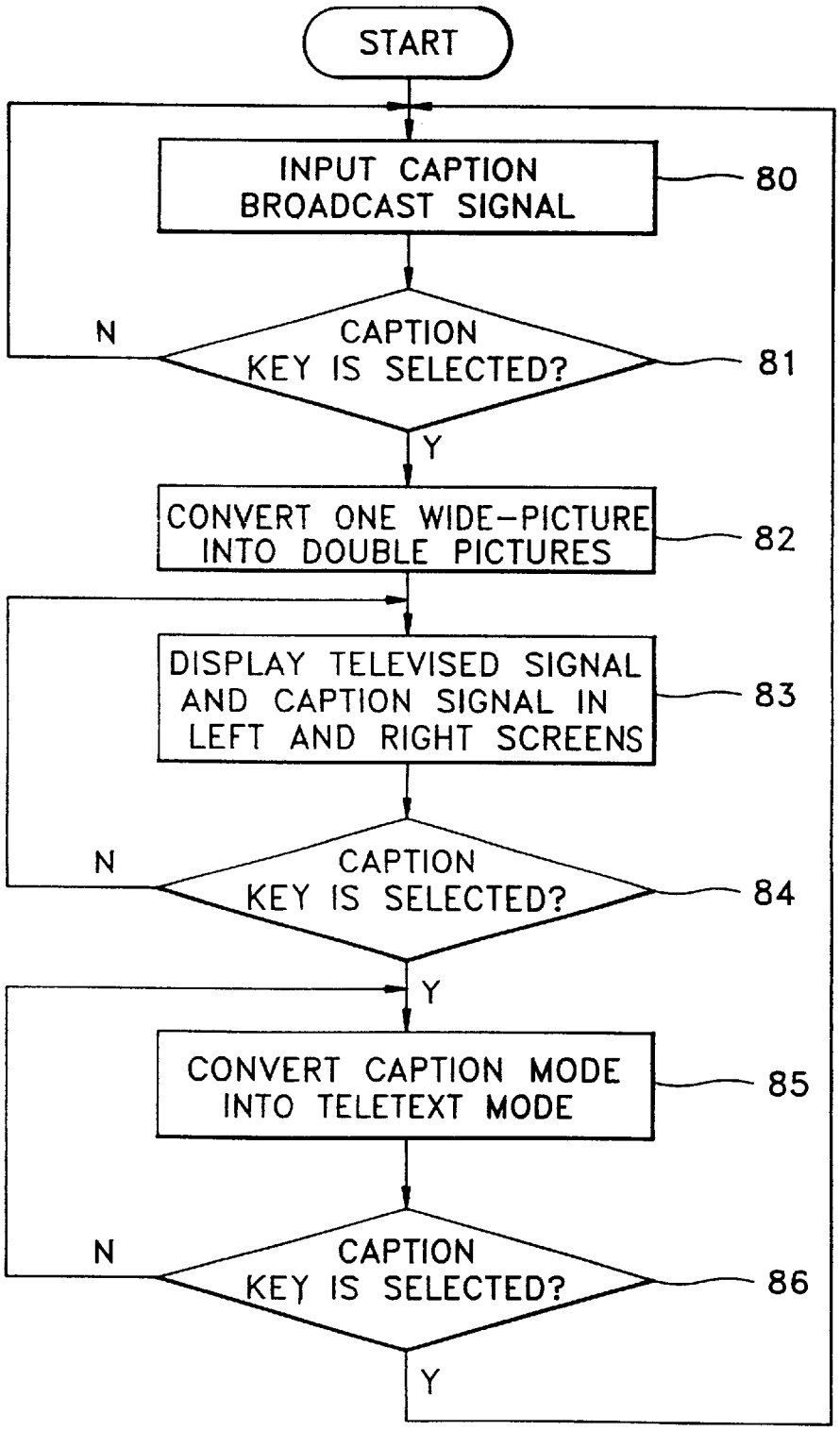
FIG. 2 is a flowchart illustrating a method for displaying a caption broadcast and teletext on the screen of a double-wide television according to another embodiment of the present invention.

FIG. 2 is a flowchart illustrating a method of displaying caption broadcast and teletext on a screen of a double-wide television according to the present invention.

As shown in FIG. 2, the method of displaying a caption broadcast and teletext includes the steps of inputting a caption broadcast signal and displaying a picture corresponding to the broadcast signal on a wide screen of a double-wide television (step 80), and selecting a caption key (first caption key selecting step 81).

The method also includes the steps of segmenting a wide-screen into at least two separate portions capable of displaying at least two distinct pictures so that a caption display mode is initiated (step 82), displaying a televised signal and a caption signal in right and left screens (step 83), respectively, selecting the caption key again (second caption key selecting step 84), and converting the caption display mode into the teletext display mode so that a picture corresponding to the teletext signal is displayed on another one of the at least two distinct portions of the wide-screen (step 85). The method also includes the step of selecting the caption key for returning the double-picture mode to the initial wide-picture mode (third caption key selecting step 86).

Hereinafter, a preferred embodiment of the present invention will be described with reference to FIGS. 1 and 2.

A double-wide television is provided according to a preferred embodiment of the present invention for displaying a video signal on a wide-screen (16:9 aspect ratio) and for simultaneously displaying two image signals introduced from each different signal source on left and right portions of the screens which are formed by dividing the wide-screen.

As shown in FIG. 1, in the television signal receiver 20, the first and second tuners 21 and 22 generate intermediate-frequency signals from a carrier wave introduced via the antenna 10, and the first and second demodulators 23 and 24 receives the intermediate-frequency signals generated from the first and second tuners 21 and 22 to generate first and second video signals and the audio signals for the left and right channels. The audio signals of the left and right channels output from the first and second demodulators 23 and 24 are reproduced as an audio signal having various modes by the audio signal processor 70. Subsequently, the audio signals are output as sound waves via the left (L) and right (R) speakers 72 and 74.

The first and second video signals respectively output from the first and second demodulators 23 and 24 are input to the video signal processor 30 in which the first and second video signals are processed so as to be displayed as two corresponding pictures in separate portions of the wide-screen. Here, the first and second video signals include the caption and teletext signals.

In the video signal processor 30, in order to simultaneously display pictures corresponding to two video signals on left and right portions of the wide-screen in a double-picture mode, the horizontal and vertical scanning periods of each video signal before being coupled to each other and the horizontal and the vertical scanning periods of the coupled video signal should be matched. Here, it is assumed that the horizontal and vertical scanning periods of the two video signals being coupled to each other are the same.

The video signals output from the first and second demodulators 23 and 24 are input to the first and second comb filters 31 and 32 in order to be output as left and right picture signals which each are separated into luminance (Y) and the chrominance (C) signals.

Also, the audio signals output from the first and second demodulators 23 and 24 are processed by the audio signal processor 70 and then output to the left and right channel speakers. Then, the audio signals are output as sound waves via the left (L) and right (R) speakers 72 and 74.

On the other hand, a first video signal (f) having the luminance (Y) and the chrominance (C) components output from the first comb filter 31 is output as the left picture signal via contact points a and c of the switch SW1.

A second video signal output from the second comb filter 32 is input to the signal separating circuit 34 and then output as the right picture signal. Here, when a caption key is selected in a key input device or panel 72, the microcomputer 71 outputs the control signal CNT3 to the signal separating portion 34. Thus, the second video signal output from the second demodulator 24 is separated into a video signal (d) and the caption and teletext signals (e) by the signal separating circuit 34.

The video signal (d) separated by the signal separating circuit 34 is output as a right picture signal, and the caption and teletext signals (e) are output to the contact point b of the switch SW1. Also, in the switch SW1, the contact point b is connected to the contact point c by the control signal (CNT2) of the microcomputer 71 to output the caption and teletext signals (e) output from the signal separating circuit 34 as a left picture signal.

The left and right picture signals output from the switch SW1 and the signal separating portion 34 are processed by the double-picture processing circuit 33 according to the control signal CNT1 of the microcomputer 71, and then the double-picture processing circuit 33 outputs the double-picture signal having the luminance (Y) and chrominance (C) signals.

Subsequently, matrix-processing is performed with respect to the luminance (Y) and the chrominance (C) signals output from the double-picture processing circuit 33 in the matrix circuit 40 which outputs RGB signals. The CRT driver 50 receives the RGB signals and drives a CRT 60 to display an image including the two separate pictures on right and left portions of the wide screen.

Next, the method for display a caption broadcast and teletext on separate portions of the wide screen of a double-wide television will be described with reference to FIG. 2.

As shown in FIG. 2, a video signal of a broadcast channel, including a caption signal, is input to the double-wide television to be displayed on a wide-screen (step 80). Subsequently, the microcomputer 71 determines whether a caption key of the key input device or panel 72 is selected by scanning the output of the key input device or panel 72 which reflects different key strokes input by a user (step 81).

If the caption key is selected, the microcomputer 71 outputs the control signal CNT1 to the double-picture processing circuit 33 to convert a single wide screen of the double-wide television into two distinct portions so that two pictures may be displayed without any overlap (step 82).

After the single screen is converted into two distinct portions the switch SW1 is switched to the contact point b by a control signal CNT2 generated by the microcomputer 71 and the signal (f) output from the first comb filter 31 is blocked. Also, the caption signal (e) output from the signal separating circuit 34 is output as the left picture signal and the video signal (d) from which the caption signal is eliminated is output as the right picture signal. As a result, the video signal (d) is displayed on the right portion of the wide screen and the caption information signal is displayed in the left portion of the wide-screen (step 83).

However, one of ordinary skill in the art will appreciate that the video signal (d) may be displayed on the right portion of the wide screen and the caption information signal displayed on the left portion thereof. Subsequently, the microcomputer 71 scans the keys to determine whether the caption key has been selected a second time (step 84). The caption key is selected a second time if the image signal includes a teletext signal. As a result, the caption display mode is converted into the teletext display mode in the signal separating circuit 34 so that a picture corresponding to the teletext signal can be displayed in the left portion of the wide-screen.

Next, the microcomputer 71 determines whether the caption key has been selected a third time by scanning the output of the key input device 72 (step 86). If the caption key is selected, the microcomputer 7 removes the caption or teletext picture displayed in the left portion of the wide-screen and restores the original wide screen by generating the control signal CNT2 again. Thus, a picture corresponding to a video signal of a broadcast channel including a caption signal may be displayed, as per step 80 described above.

By employing the apparatus and method of displaying a caption broadcast and teletext of the present invention, the televised picture and the caption broadcast or teletext picture can be displayed in two separate portions of the wide-screen of a double-wide television so that the pictures do not overlap each other.

What is claimed is:

1. An apparatus for displaying a caption broadcast and teletext on a wide-screen of a double-wide television that separates first and second broadcast signals, including video information and caption and teletext information, into luminance (Y) and chrominance (C) signals using first and second comb filters which output said first and second broadcast signals, said apparatus comprising:

a signal separating circuit for separating a second video signal output from said second comb filter into a first picture signal and caption and teletext signals;

a switching circuit for selectively outputting a first video signal output from said first comb filter and said caption and teletext signals output from said signal separating circuit;

a double-picture processing circuit for processing said first picture signal output by said signal separation circuit and said caption and teletext signals output from said switching circuit so that pictures corresponding to said first picture signal and said caption and teletext signals can be displayed without overlap in left and right portions of said wide-screen respectively;

a controller for controlling said signal separating circuit to separate said second video signal into said first picture signal and said caption and teletext signals according to a key input, controlling said switching circuit to selectively output said first video signal output from said first comb filter and said caption and teletext signals output from said signal separating circuit and controlling said double-picture processing circuit;

a matrix circuit for converting a third video signal output from said double-picture processing circuit, having first and second luminance and chrominance components, into a fourth video signal having RGB components; and a CRT driver for driving a CRT using said fourth video signal having RGB components.

2. The apparatus defined in claim 1, further comprising a television signal receiver which produces said first and second broadcast signals from a carrier wave and outputs said first and second broadcast signals to said first and second comb filters, respectively.

3. The apparatus defined in claim 2, further comprising an antenna for receiving said carrier wave.

4. The apparatus defined in claim 2, further comprising an audio signal processor for processing audio information included in said first and second broadcast signals output by said television signal receiver and outputting right and left channel audio signals.

5. The apparatus defined in claim 4, further comprising first and second audio speakers which output soundwaves in response to said right and left channel audio signals, respectively.

6. The apparatus defined in claim 1, wherein the controller comprises a microcomputer.

7. The apparatus defined in claim 1, further comprising a key input device into which said key input is entered.

8. The apparatus defined in claim 5, further comprising a key input device into which said key input is entered.

9. A method for displaying a caption broadcast and teletext on a wide-screen of a double-wide television, comprising the steps of:

(a) displaying a picture corresponding to a broadcast signal including caption and teletext signals on said wide-screen of said double-wide television;

(b) segmenting said wide-screen into at least two distinct portions if it is determined that a caption key is selected so that a caption display mode is initiated;

(c) displaying without overlap a televised picture in one of said at least two distinct portions and a picture corresponding to said caption broadcast signal in another one of said at least two distinct portions segmented in said step (b).

10. The method defined in claim 9 further comprising the step of converting said caption display mode into a teletext display mode if the caption key is selected during said step of displaying a televised picture in one of at least two distinct portions so that a picture corresponding to said teletext signal is displayed in said another one of said at least two distinct portions.

11. The method defined in claim 10 further comprising the step of returning to said step of displaying a picture corresponding to a broadcast signal if the caption key is selected again when said teletext signal is displayed in said another one of said at least two distinct portions.

*12. A method for displaying a video signal and a text signal on a wide screen of a double-wide television, comprising the steps of:*

(*a*) *displaying a picture corresponding to said video signal on said wide screen of said television;*

(*b*) *segmenting said wide screen into at least two distinct portions;*

(*c*) *displaying without overlap said picture corresponding to said video signal in one of said distinct portions and a picture corresponding to said text signal in another one of said at least two distinct portions segmented in said step* (*b*).

*13. The method as claimed in claim 12 wherein said segmenting step is activated by a user controlled switch.*

*14. The method as claimed in claim 13 wherein a consecutive actuation of said switch initiates consecutive displaying of a plurality of different types of said text signal.*

*15. The method as claimed in claim 14 wherein said different types of said text signal comprises of teletext or caption.*

*16. The method as claimed in claim 13 wherein after said switch is actuated a predetermined number of times, said displaying step* (*c*) *is terminated.*

*17. The method as claimed in claim 12 wherein said video signal is a broadcast signal.*

*18. The method as claimed in claim 17 wherein said video signal and said text signal is received by said television in a single broadcast channel.*

*19. The method as claimed in claim 18 further comprising the step of separating said text signal from said video signal.*

*20. The method as claimed in claim 12 wherein said text signal contains supplemental information having a predetermined relationship to said video signal.*

*21. The method as claimed in claim 12 wherein said text signal contains information which have no relationship to said video signal.*

*22. A method for displaying a video signal and a text signal on a wide screen of a double-picture display television, comprising the steps of:*

(*a*) *receiving the video signal and the text signal;*

(*b*) *segmenting said wide screen into at least two distinct portions;*

(*c*) *displaying without overlap a picture corresponding to said video signal in one of said at least two distinct portions segmented in said step* (*b*) *and a picture corresponding to said text signal in another one of said at least two distinct portions segmented in said step* (*b*).

* * * * *